N. S. TWIFORD, DEC'D.
G. A. TWIFORD, ADMINISTRATRIX.
SYSTEM FOR THE AUTOMATIC CONTROL AND DISTRIBUTION OF WATER FOR IRRIGATION.
APPLICATION FILED FEB. 4, 1907.
917,381.
Patented Apr. 6, 1909.
2 SHEETS—SHEET 1.
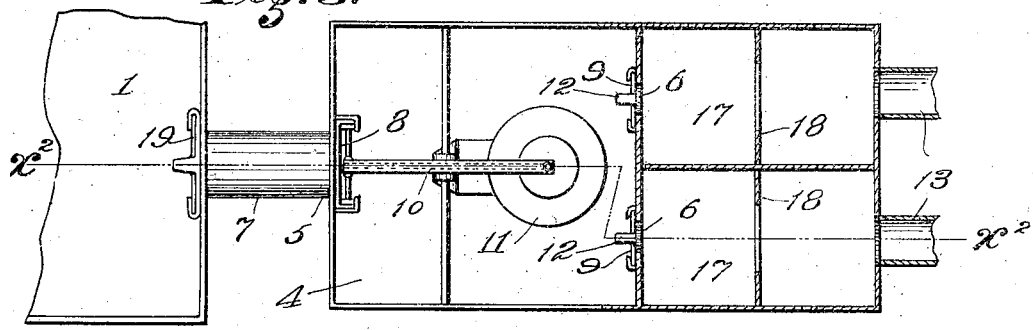
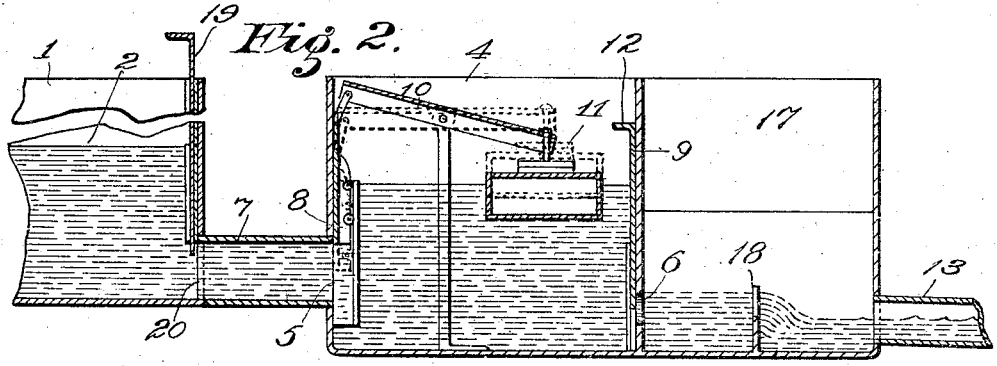
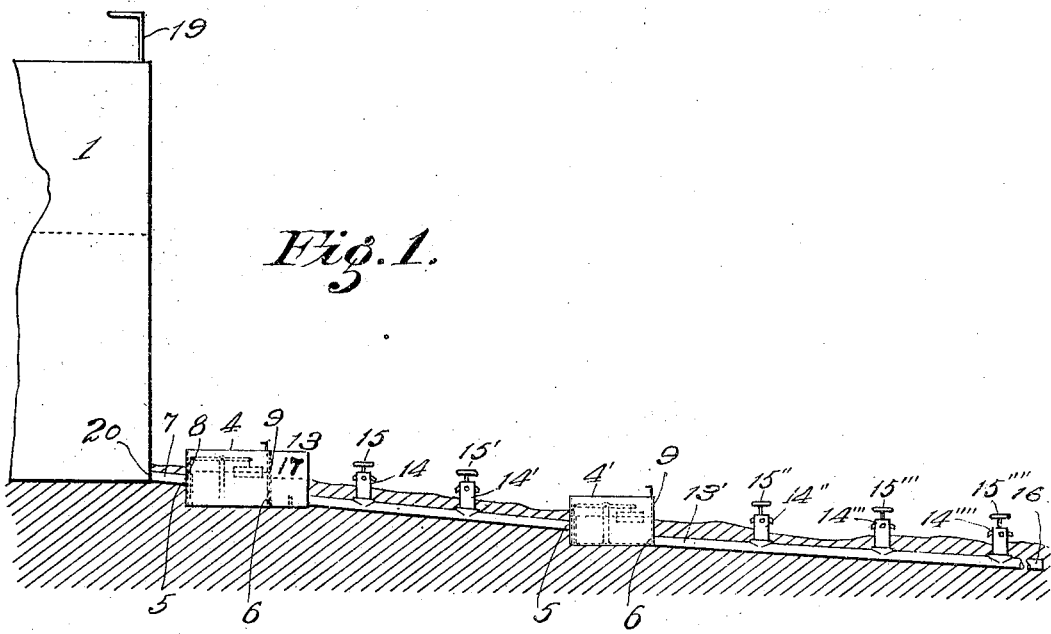

N. S. TWIFORD, DEC'D.
G. A. TWIFORD, ADMINISTRATRIX.
SYSTEM FOR THE AUTOMATIC CONTROL AND DISTRIBUTION OF WATER FOR IRRIGATION.
APPLICATION FILED FEB. 4, 1907.
917,381.
Patented Apr. 6, 1909.
2 SHEETS—SHEET 2.
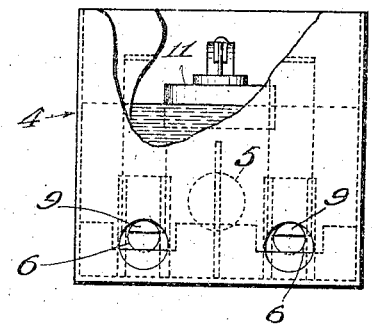
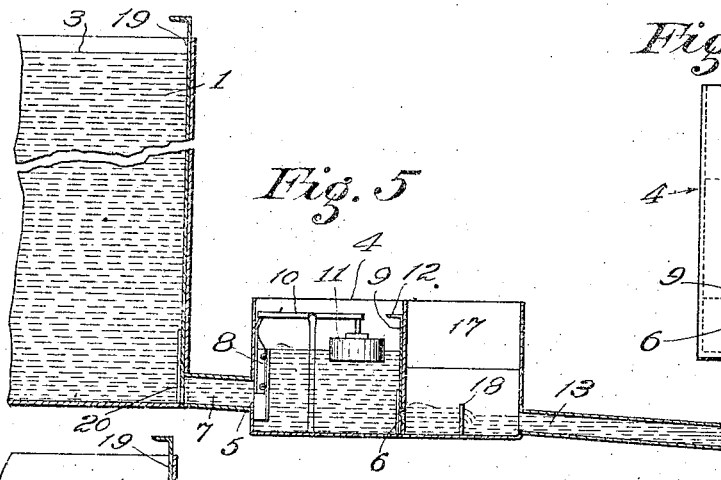
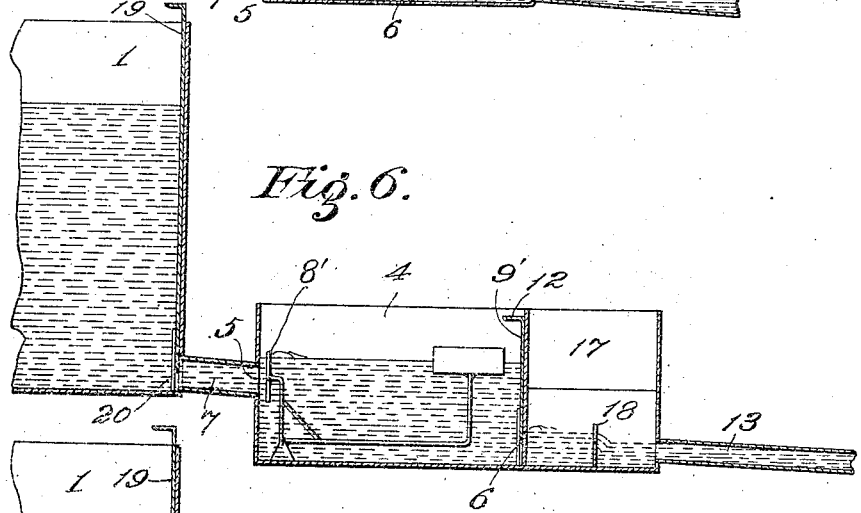
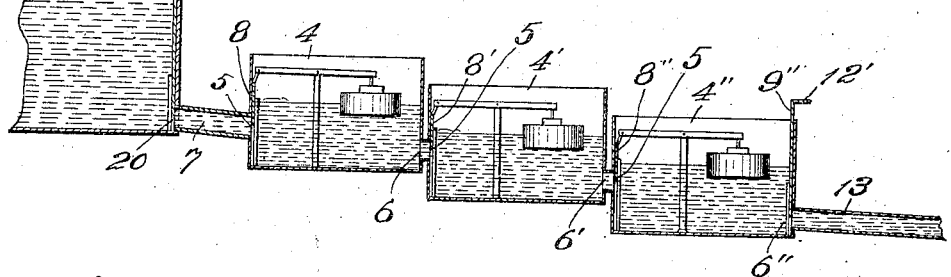
Witnesses:
F. N. Kirkby
M. B. Townsend
Inventor:
Nicholas S. Twiford
by James R. Townsend
his atty

UNITED STATES PATENT OFFICE.

NICHOLAS S. TWIFORD, OF POMONA, CALIFORNIA; GRACE A. TWIFORD ADMINISTRATRIX OF SAID NICHOLAS S. TWIFORD, DECEASED.

SYSTEM FOR THE AUTOMATIC CONTROL AND DISTRIBUTION OF WATER FOR IRRIGATION.

No. 917,381.      Specification of Letters Patent.      Patented April 6, 1909.

Application filed February 4, 1907. Serial No. 355,758.

*To all whom it may concern:*

Be it known that I, NICHOLAS S. TWIFORD, a citizen of the United States, residing at Pomona, in the county of Los Angeles and State of California, have invented a new and useful System for the Automatic Control and Distribution of Water for Irrigation, of which the following is a specification.

In irrigating land, it is very desirable that the stream of water distributed to the irrigating furrows by the attendant shall remain of the same volume throughout the entire period that the water is allowed to flow. If a variable head of water is admitted to the furrows, unsatisfactory results ensue. Some means of keeping the flow of water uniform at the volume the irrigator may desire, is a need which practical irrigators realize is essential to good irrigating and economical use of water, especially in orchard work and furrow irrigation.

When a stream of water is distributed upon the land to be irrigated, any decrease in its volume will cause it to flow over less land than intended, or to not run so far in the furrows; an increase in its volume causes it to flow over more land, or to run farther in the furrows. These fluctuations give the irrigator trouble, causing imperfect irrigation and the loss of water and time. The uneven flow is the greatest trouble in irrigating from reservoirs of small capacity as compared with the requirements of the system, for the reason that a small reservoir such as a small land-owner may be able to construct, and which is sufficient to store water enough for one irrigation for his land, will necessarily lower its water level as the water is drawn from it for irrigation, so that at the beginning of the work a strong flow of water will occur, and as the water lowers in the reservoir the force of the flow will decrease, thus requiring attention on the part of the irrigator to open larger inlets to the furrows from the main ditch in order that the same amount of water may go through such furrows as originally provided for; or, the gate at the reservoir may have to be opened more widely as the head of water in said reservoir decreases. There is at present no irrigating system in which the trouble thus arising can be avoided.

It is one of the objects of this invention to devise a means of keeping the flow of the stream of water from such a variable head uniform throughout the period of irrigation at the volume the irrigator may desire, allowing the irrigator to vary said volume as he wills, so that he will have complete control of the water and can depend upon uniformity of irrigation in accordance with the way which he determines upon, and this without requiring his constant attention.

When the irrigator applies a stream of water to the land in many smaller streams, these streams are affected by the change in volume of one another. If some are increased in volume it diminishes the rest, and if some are decreased in volume this increases the others.

It is an object of this invention to prevent such action of one stream on another.

Another object of the invention is to enable ranch-owners to construct pressure lines for distributing purposes, of cement pipe no matter what the incline of the pipe-line may be. Under former systems the use of cement pipe for pressure lines where the incline is considerable, has been impracticable on account of the comparatively slight strength of the cement pipe.

My invention is designed to enable the ranchman to supply irrigating water under such pressure as the cement pipe will stand, regardless of the steepness of the incline and the difference in height between the lower and the upper ends of the system.

The accompanying drawings illustrate the invention. Figure 1 is a fragmental, sectional elevation of a water system embodying the invention as applied with cement pipe having hydrants with valves thereon to maintain pressure in said pipe. Fig. 2 is a fragmental, sectional detail of the upper portion of the same. Fig. 3 is a fragmental plan view, partly in section, of the parts shown in Fig. 2. Fig. 4 is an elevation from the right of Figs. 2 and 3, omitting the reservoir. Fig. 5 is another view of the parts shown in Figs. 1 and 2 and illustrates the operation when the reservoir has a heavy head or great depth of water. Fig. 6 is a fragmental sectional elevation of portions at the head of the system showing a modified form of apparatus for controlling the flow. Fig. 7 shows the upper portion of a system applied with a series of regulating chambers, the inlets of one or more of which constitute the outlets of the preceding chamber.

In the several views 1 designates a reservoir having a variable head, as indicated by comparison between Figs. 2 and 5, where the different levels of the water are indicated at 2 and 3 respectively.

4 is a chamber having an inlet 5 and an outlet 6. 7 is a conduit connecting the reservoir with the inlet of said chamber.

8 is a gate regulating the inlet.

9 is a gate to regulate the outlet.

10, 11, designate means operable by the rise and fall of the water in said chamber to close and open the inlet-gate to correspond with the rise and fall of the water level in the chamber. The gate 9 is operable by handle 12 to open and close the gate 6 more or less as may be required to supply to conduit 13 the desired volume of water.

14 designates hydrants controlled by valves 15 through which water may be delivered directly to the irrigating furrows.

In the drawings, parts which are practically duplicates of each other are indicated by the same character with the addition of an exponent.

The character 13 designates a pressure conduit made of concrete pipe, and the regulating chambers 4 and 4' constitute means interposed in the system between the reservoir and hydrants, as 14", 14''', 14'''', to limit the flow to the hydrants. The regulating chamber 4 limits the flow to the hydrants 14, 14', and to the regulating chamber 4', which latter chamber in turn limits the flow to the succeeding hydrants. The portions of the pressure pipes 13 and 13' between the regulating chamber 4 and the closed end 16 of the system are capable of withstanding a limited pressure.

When the pressure in the reservoir or tank 1 is high the amount of water flowing therefrom through the inlet 5 will flow more rapidly than will be the case when the level of the tank or reservoir is lowered. When the level of the water in the tank or reservoir 1 is high, as indicated in Fig. 5, the flow through the inlet 5 will be under considerable pressure and will therefore tend to supply a larger amount of water to the regulating chamber than in the case illustrated in Fig. 2 where the level of the water has fallen. The rise of the water in the chamber operates the gate to reduce the area of the inlet of the chamber and thereby regulates the supply.

The irrigator, by means of the handle 12, will set the gate 9 at a point where the pressure of the water in the regulating chamber will deliver approximately the stream he desires.

In case the operation of irrigating begins with the level of the water high, as indicated in Fig. 5, the water will flow with considerable force into the regulating chamber and will raise the level of the water therein, thus lowering the gate 8 and shutting off some of the water, so that the level of the water in the regulating chamber will remain constant at a point where the outflow through outlet 6 will be that required by the irrigator. As the water in the tank or reservoir 1 falls, the flow through the inlet 5 is diminished and the water level in the regulating chamber falls, thus lowering the float 11 and raising the gate 8 to admit more water so as to approximately maintain the requisite outflow through 6.

Under ordinary circumstances the use of a single regulating chamber will give sufficient regularity to the stream, but in case it is desired to avoid any fluctuations in the stream a plurality of regulating chambers, as shown in Fig. 7, may be employed. It is to be understood that the conduit through which the final delivery is made to the irrigating system may be an open ditch, not shown, as well as the pipe 13.

17 designates a weir chamber provided with a weir 18 by which the irrigator can determine the amount of water that is flowing through the regulating chamber. By this indicating means he will be enabled to accurately establish the volume of flow that he desires for irrigation purposes; the same being once determined by experiment, can afterward be determined by inspection of the weir.

19 is a gate at the outlet 20 of the reservoir by which the irrigator may regulate the volume of water admitted to the regulating chamber in the first instance. In the form shown in Fig. 7 the gate 12' serves as an indicator of the amount of water that is allowed to flow through the outlet 6".

In Fig. 7, the outlet from the first regulating chamber forms the inlet for the second, and the outlet for the second forms the inlet for the third regulating chamber, and the second gate 8' at once regulates the discharge from the regulating chamber 4 and the supply to the regulating chamber 4', while the gate 8" regulates the discharge from the regulating chamber 4' and the supply to the regulating chamber 4". The final regulation is accomplished by the gate 9".

What I claim is:—

1. In an irrigating system, the combination of a chamber having an inlet and an outlet, a conduit connecting the reservoir with the inlet of said chamber, a gate to regulate the inlet, a gate to regulate the outlet, and means operable by the rise and fall of water in said chamber to close and open the inlet-gate in correspondence with the rise and fall of the water level in the chamber.

2. A water system provided with a plurality of chambers communicating with each other successively, and each provided with an inlet and an outlet, gates for controlling the inlets respectively, and means in the respective chambers for operating said gates, the outlet for one or more of the chambers being practically the inlet for the chamber succeeding the same.

3. An irrigating system comprising a chamber having an inlet and an outlet, the inlet communicating with the reservoir, a gate to regulate the inlet, a gate to regulate the outlet, means operable by the rise and fall of water in said chamber to close and open the inlet-gate in correspondence with the rise and fall of the water level in the chamber, and a weir chamber with a weir therein to receive and discharge the water delivered at the outlet.

4. An irrigating system comprising a chamber having an inlet and an outlet, the inlet communicating with the reservoir, a gate to regulate the inlet, a gate to regulate the outlet, means operable by the rise and fall of water in said chamber to close and open the inlet-gate in correspondence with the rise and fall of the water level in the chamber, and indicating means to indicate the volume of water flowing through the outlet.

5. An irrigating system comprising the combination, of a chamber having an inlet and an outlet, means to regulate the inlet, means to regulate the outlet, and means operable by the rise and fall of water in said chamber controlling the inlet-regulating means.

In testimony whereof, I have hereunto set my hand at Pomona, California this 26th day of January 1907.

NICHOLAS S. TWIFORD.

In presence of—
  R. B. SWATMAN,
  G. A. TWIFORD.